April 12, 1932.  J. E. HORN  1,853,729
PLANT CHOPPER AND ALL PURPOSE HOE
Filed March 14, 1930
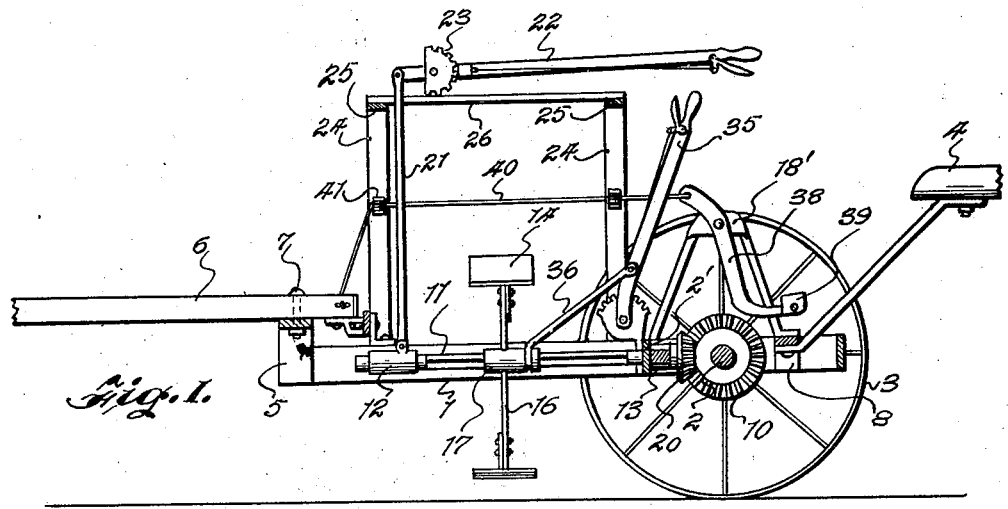
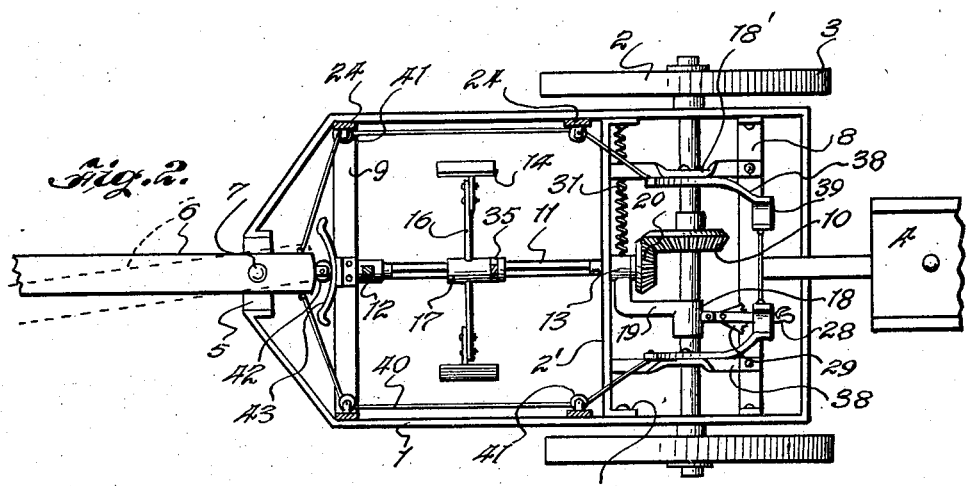
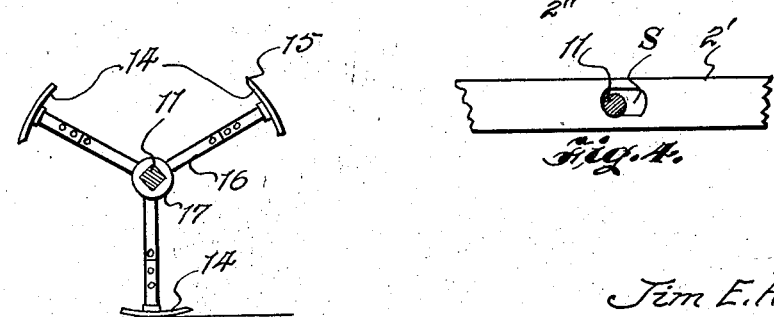
INVENTOR.
Jim E. Horn,
BY
John M. Spellman
ATTORNEY.

Patented Apr. 12, 1932

1,853,729

UNITED STATES PATENT OFFICE

JIM E. HORN, OF LEONARD, TEXAS

PLANT CHOPPER AND ALL PURPOSE HOE

Application filed March 14, 1930. Serial No. 435,886.

The primary object of my invention is the provision of a machine for chopping row plants, such as cotton, corn, beans, peas or the like, in the thinning of the plants and in the removal of weeds therefrom.

More particularly my invention aims to provide a machine of this character which conforms as nearly as possible to the operation of a hand hoe manipulated by an individual, whereby the plants may be thinned at properly spaced points and the weeds removed by a mechanism supported upon wheels and operated by one individual.

Another particular object of my invention is to provide a machine of this nature which is practical in operation and made up of few parts, and strong and durable in construction.

For a thorough understanding of my improved chopper, reference is made to the accompanying drawings, forming a part of this specification, and wherein:

Figure 1 is a partial side elevational view of the chopper, part of the framework and one wheel being removed.

Figure 2 is a partial top plan view, a portion of the frame being cut away.

Figure 3 is a side elevational view of the hoes, showing their connection to their supporting shaft, and Figure 4 is a detail view showing the supporting means for one end of the hoe shaft.

Having a more detailed reference to the drawings, the machine consists of a frame 1, mounted upon an axle 2, and supported by the wheels 3. The rear of the frame is directed outwardly at one point to provide a support for a seat 4, while the front of the frame is extended forwardly and provides a support 5 for a tongue 6, the latter being pivoted to the support 5 by a pin 7. Adjacent the seat is a cross bar 8, and at the forepart of the frame is another cross bar 9, these cross bars serving to brace the frame and for the purpose of supporting parts hereinafter pointed out.

The novel feature of the chopper resides in the hoes and in the mechanism by which they are made to operate, including the means for controlling such operation. The arrangement is carried out in such a manner as will enable the operator to chop out weeds and plants at spaced intervals along the row of plants which the machine straddles and for shifting the hoes whenever necessary to maintain the proper spacing at the points where the hoes are to chop.

To accomplish these purposes there is keyed to the axle 2 a bevel gear 10 which serves to drive the shaft upon which the hoes are mounted to revolve. This shaft, indicated at 11, is of square formation along its principal length and the ends are rounded for the purpose of seating them in the bearings 12 and 13. The hoes 14 are adjustably mounted on the radials 16 of a hub 17 and are provided with sharp edges as at 15. In Figure 3 is shown a cross-section of the shaft 11 with the hub, of squared interior, mounted thereon, so that the hub will be permitted to slide along the shaft, as will be referred to hereinafter.

For strengthening the machine and for more effectually stabilizing the shaft 11 against vibration, there is provided a cross bar 2' with a slot S through which the shaft 11 protrudes in maintaining its approximate horizontal position. This cross bar is bolted at 2'' to the frame.

Slidably mounted on the axle 2 is a sleeve 18, the sleeve having an angular projection 19 and carrying the bearing 13. The shaft 11 is supported at one end in this bearing and on this end of the shaft is mounted a bevel gear 20, normally in mesh with the bevel gear 10. The forward end of the shaft 11 is mounted in the bearing 12 and this bearing is supported by a link 21, the link in turn being pivoted to a lever 22, and the lever having pivotal connection with a quadrant 23. For supporting this quadrant in position there are the uprights 24, upper cross-bars 25 and a central longitudinal bar 26. Upon the latter the quadrant is secured.

From the foregoing it will be apparent that the movement of the chopper through the field will rotate the shaft 11 and thus revolve the hoes laterally across the row of plants. When it is desirous of throwing the gearing out of operation in moving the chopper from place to place or for other reasons, this can easily be accomplished by means of the small lever 28 with quadrant 29, this lever having pivotal connection with the sleeve 18 and quadrant 29. The quadrant is fastened to the bar 8, but the inner end of the lever 28 has a loose connection with the sleeve 18, such as by a few links of chain or the like, to provide enough play to allow the sleeve 18 to move on the axle without interference of lever 28.

Normally the gears are held in mesh by a spring 31, but obviously movement of the small lever 28 laterally will draw the sleeve 18 along the axle and thus move the pinion gear 20 from the gear 10. When thus separated the gears are maintained inoperative by means of the quadrant 29. The hoes can be raised and lowered to adjust them to uneven ground by a downward or upward movement of the lever 22. During such raising and lowering operation the gears will not be thrown out of mesh but will maintain their proper meshed relationship because the sleeve 18 is allowed to rotate on the axle and the angular member 19 follows a circumferential spaced relation with the axle. The opening S affords enough space to allow movement of the inner end of shaft 11 without binding, as will be apparent, as the inner end of this shaft is moved only slightly when the forward end is lifted.

Particular attention is directed to the means for sliding the hub with the hoes along its shaft, as this arrangement permits the operator to adjust the hoes for proper spacing in chopping. This is accomplished by means of a lever 35 in connection with a link 36, the latter being connected to the hub 17. Thus when the hoes need adjustment for proper chopping spaces along a row, this adjustment can be made instantly by sliding the hub and hoes along the shaft, either backward or forward. In chopping the weeds after the plants have been thinned, the hoes can be adjusted so as to register with the previously cut spaces between the plants by the shifting of the hub, and adjusting the hub from time to time as required.

There are also provided means in the construction of the machine for guiding the chopper which is accomplished by foot levers 38 and stirrups 39, the levers being pivoted to the members 18'. These stirrups are connected to cables or wires 40, running over suitable pulleys 41, and secured to the inward end of the tongue 6. Then there are also a roller and track 42 and 43 to enable the swinging movement of the tongue to be made easily. The tongue will thus be enabled to swing laterally when the stirrups are moved, as will be apparent by the broken-line position of the tongue in Figure 2.

While the disclosure illustrates and describes a practical working embodiment of the invention, it is to be understood that the specific means may be altered and modified to such an extent as would be within the scope and meaning of the appended claim.

What is claimed as new is:

A plant chopper comprising a frame-work and supporting wheels, a shaft carrying a plurality of chopping members, a bearing for supporting the forward end of said shaft and a bearing for the inner end of said shaft, a link pivotally connected to said forward bearing, an operating lever pivoted to the link and providing means for raising and lowering one end of the shaft in adjusting the chopping members to the ground; said inner bearing including means loosely connecting the bearing to the axle, and a cross bar with an opening through which the shaft passes and which provides a support for the inner end of said shaft and the inner bearing.

In testimony whereof I affix my signature.

JIM E. HORN.